Oct. 10, 1939.                R. R. HAUGH                2,175,262
                          EGG-CANDLING MACHINE
                        Filed Aug. 31, 1934        6 Sheets-Sheet 1

Inventor
Raymond R. Haugh
By Fisher, Clapp, Soans + Pond Attys.

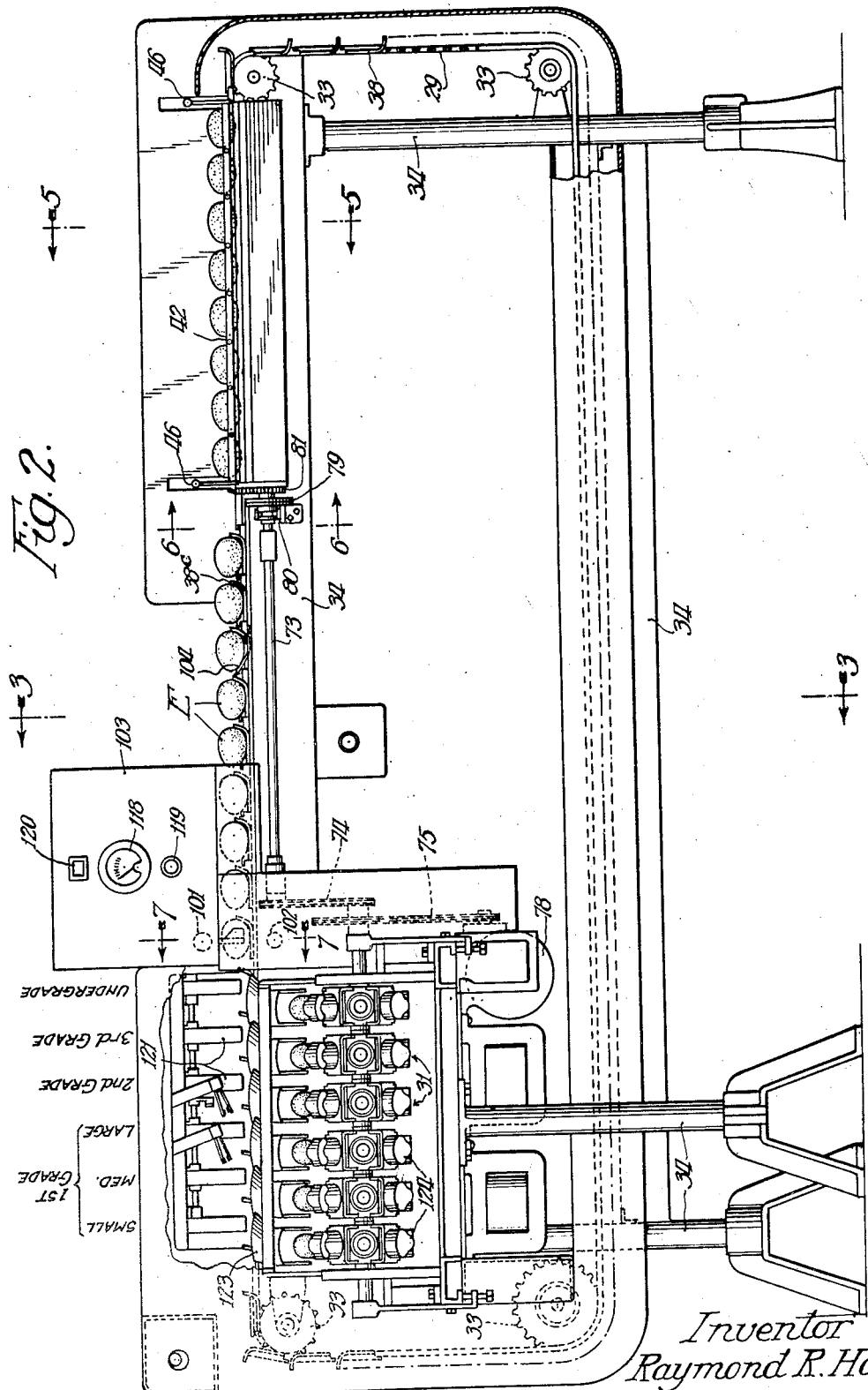

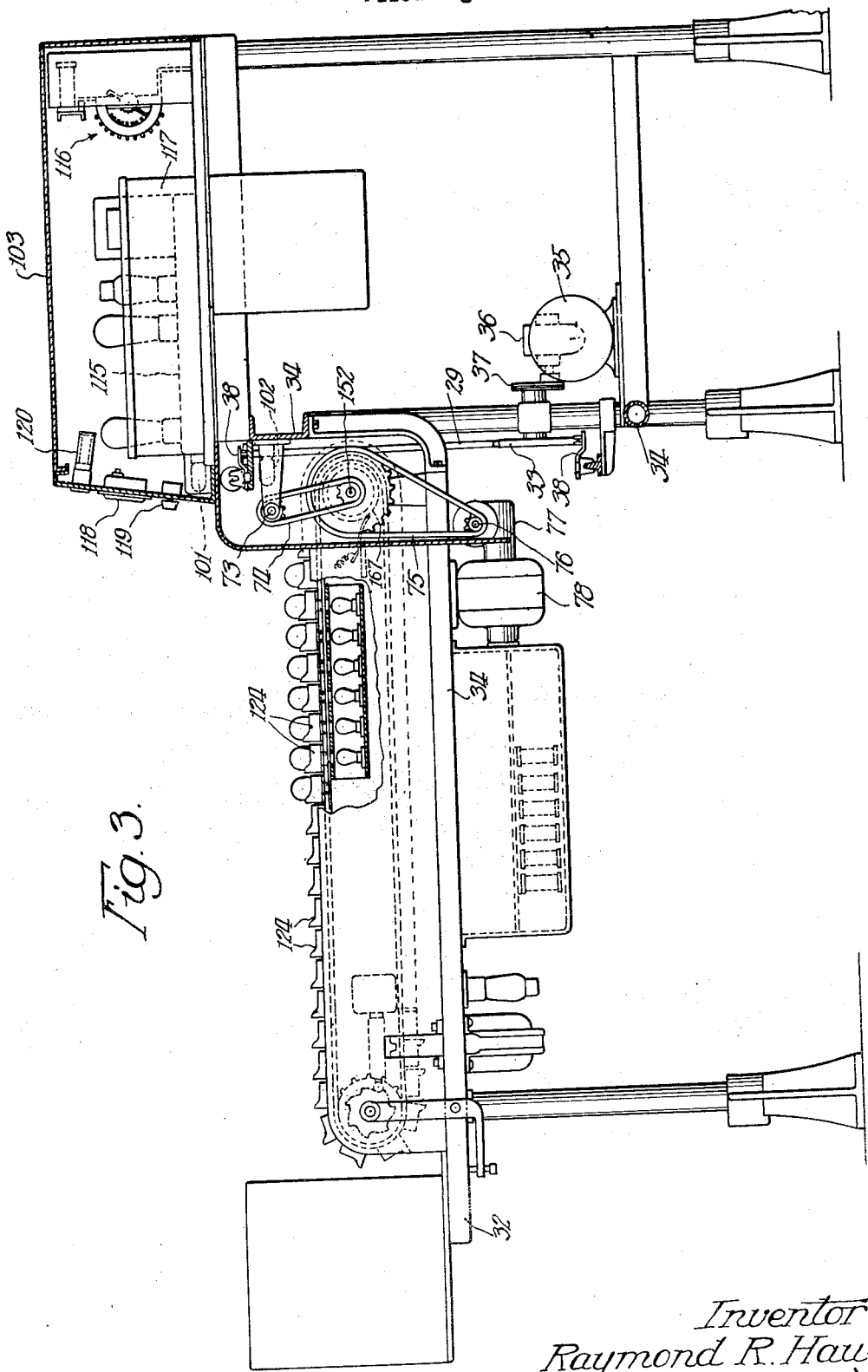

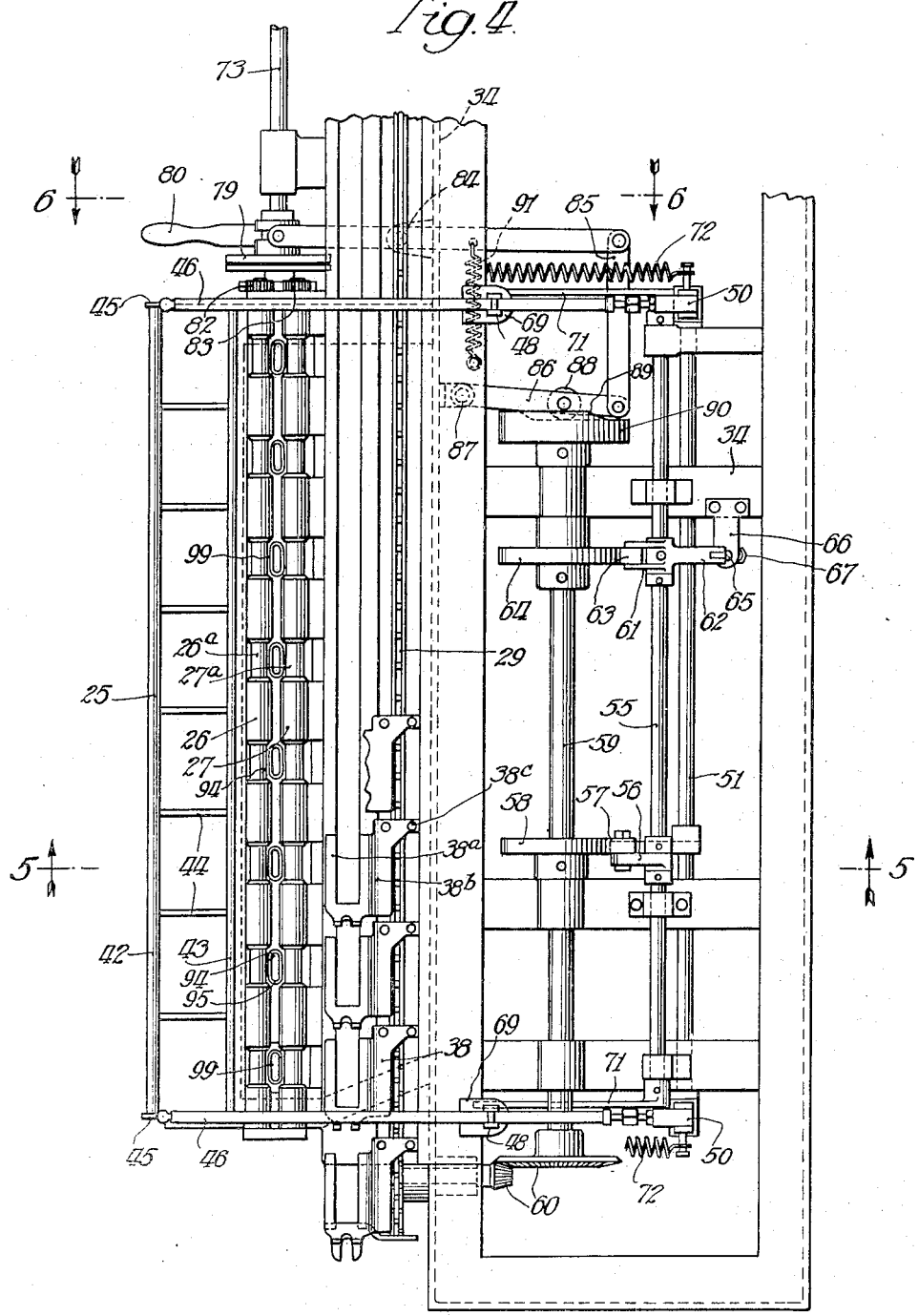

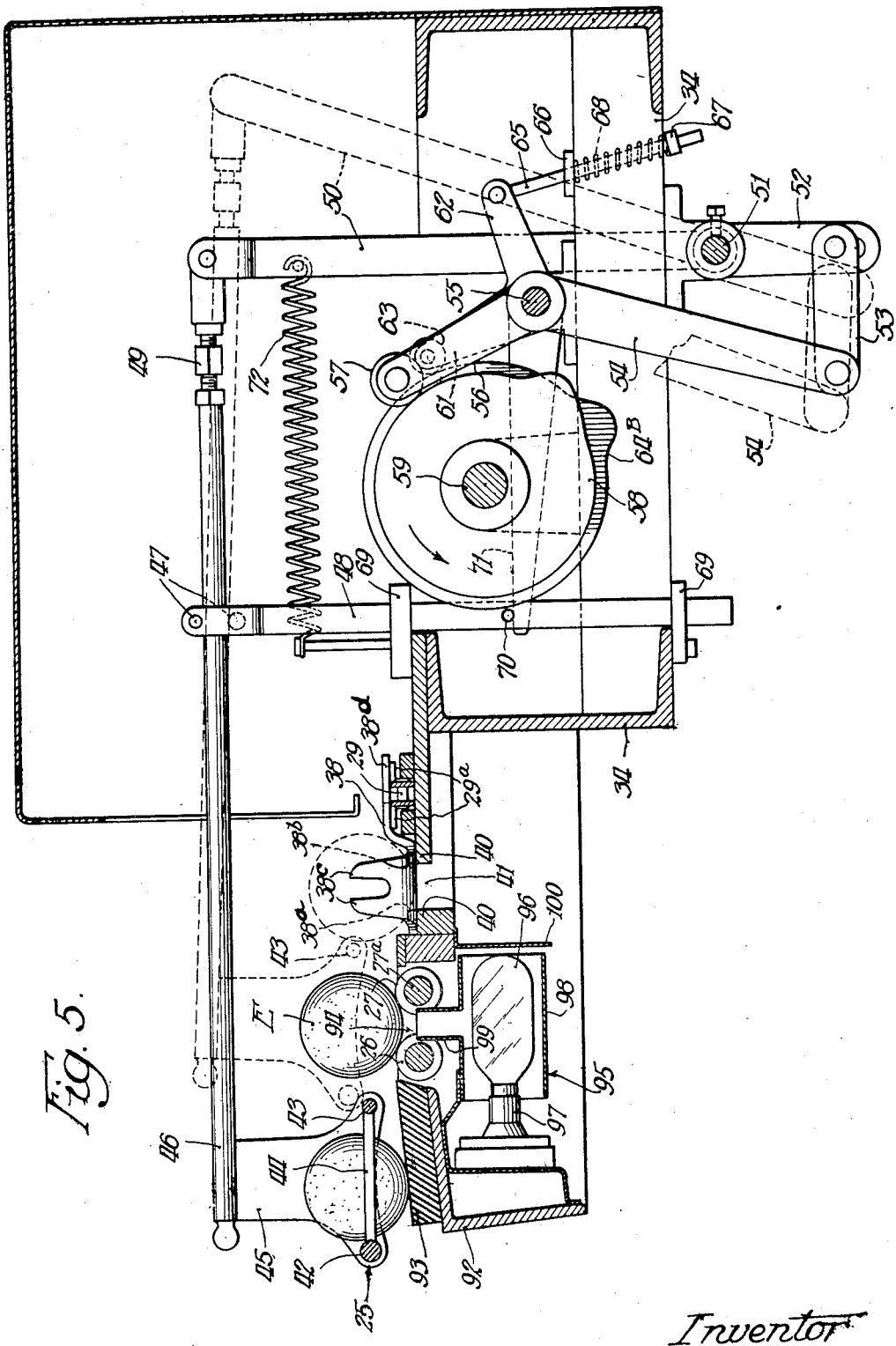

Oct. 10, 1939. R. R. HAUGH 2,175,262
EGG-CANDLING MACHINE
Filed Aug. 31, 1934 6 Sheets-Sheet 6
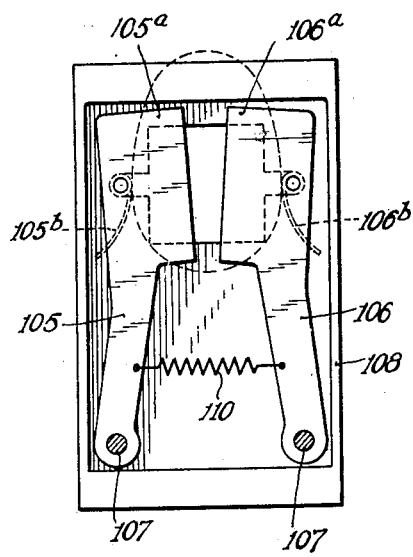
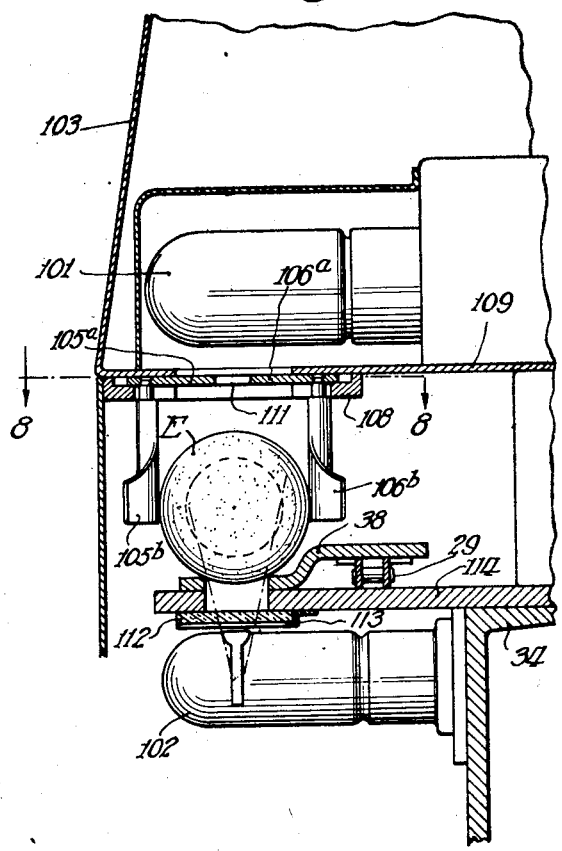
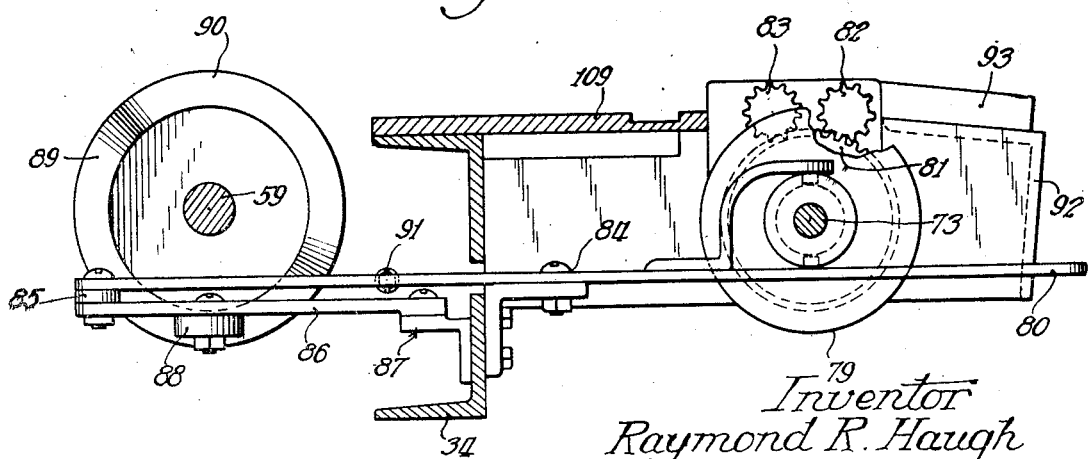
Inventor
Raymond R. Haugh
By Fisher, Clapp, Soans & Pond Attys.

Patented Oct. 10, 1939

2,175,262

UNITED STATES PATENT OFFICE 2,175,262

EGG-CANDLING MACHINE

Raymond R. Haugh, Chicago, Ill., assignor, by mesne assignments, to Kraft-Phenix Cheese Corporation, Chicago, Ill., a corporation of Delaware Application August 31, 1934, Serial No. 742,223

11 Claims. (Cl. 88—14.5)

This invention relates to improvements in egg candling machinery,—that is to say, to improvements in machines for inspecting and grading eggs according to their quality, based on certain characteristics which I have found are determinative of the quality and grade of eggs.

It is generally understood that a fresh, high-grade egg is possessed of a white or albuminous part which is fairly thick. With increased age, the white of the egg becomes thinner and the yolk tends to rise to the top of the egg. This circumstance is utilized to advantage in the mechanism about to be explained.

Grading of eggs also takes into consideration the size of the air cell which is always formed at one end of the egg, cleanliness of the egg, checks or cracks, especially those which are normally invisible to the naked eye, and miscellaneous spots, such as blood spots, which are sometimes formed in the egg.

The size of the eggs is also an important consideration. The highest grade eggs are not only clean and fresh and free from checks or blood spots, but they are also eggs of a minimum size. For practical purposes, eggs may be graded according to three sizes, for example, small, which may be 41.5 mms. or less and weigh approximately 22 oz. per dozen; medium, between 41.5 mms. and 42.5 mms. and averaging 24 oz. per dozen, and large, which measure 42.5 mms. and over and weigh an average of 25 oz. and over per dozen.

The conventional method of inspecting eggs prior to this invention has been by placing each egg in front of a suitable light and then visually checking the egg to determine the condition of the white and other elements supposed to be determinative of its quality, such inspection being essentially a visual inspection. Some candlers also endeavor to base their judgment on the mobility of the yolk, as ascertained by watching the movement of the yolk after spinning and stopping the rotation of the egg. This form of inspection is of course wholly dependent upon the judgment of the egg candler, and actual tests have indicated that the same batch of eggs is practically never graded the same by different candlers.

The main objects of the present invention are to provide mechanism which will facilitate the making of a preliminary or visual inspection of eggs for so-called dirties, checks, blood spots, air cell size, and other characteristics which are normally determined in the conventional visual candling of eggs.

Other objects of the invention are to provide egg inspecting and grading mechanism which will make possible the inspection and grading of a much larger volume of eggs, person for person, in a given time than has been possible by existing methods of inspection; and to provide inspecting means as above indicated which will eliminate substantially all the errors in judgment which are prevalent in methods of inspection heretofore extant.

Still further objects are to provide mechanism of the character indicated which may be economically produced, operated and maintained, especially when due consideration is given to the volume of work handled by the mechanism, and to produce a machine of the character indicated which may be operated by persons relatively unskilled in the egg candling art.

Other objects and advantages of the present invention will be understood by reference to the following specification and accompanying drawings (6 sheets) wherein there is illustrated an egg candling machine embodying a selected form of the invention.

In the drawings—

Fig. 2 is a front elevation of the left-hand side of Fig. 1;

Fig. 3 is a section on the line 3—3 of Figs. 1 and 2;

Fig. 4 is a fragmentary plan corresponding to a portion of Fig. 1, certain cover elements being removed to expose and more clearly illustrate the working parts;

Fig. 5 is a section on the line 5—5 of Figs. 1 and 2;

Fig. 6 is a section on the line 6—6 of Figs. 2 and 4;

Fig. 7 is a section on the line 7—7 of Figs. 1 and 2; and

Fig. 8 is a section on the line 8—8 of Fig. 7.

*General operation*

Figure 1:
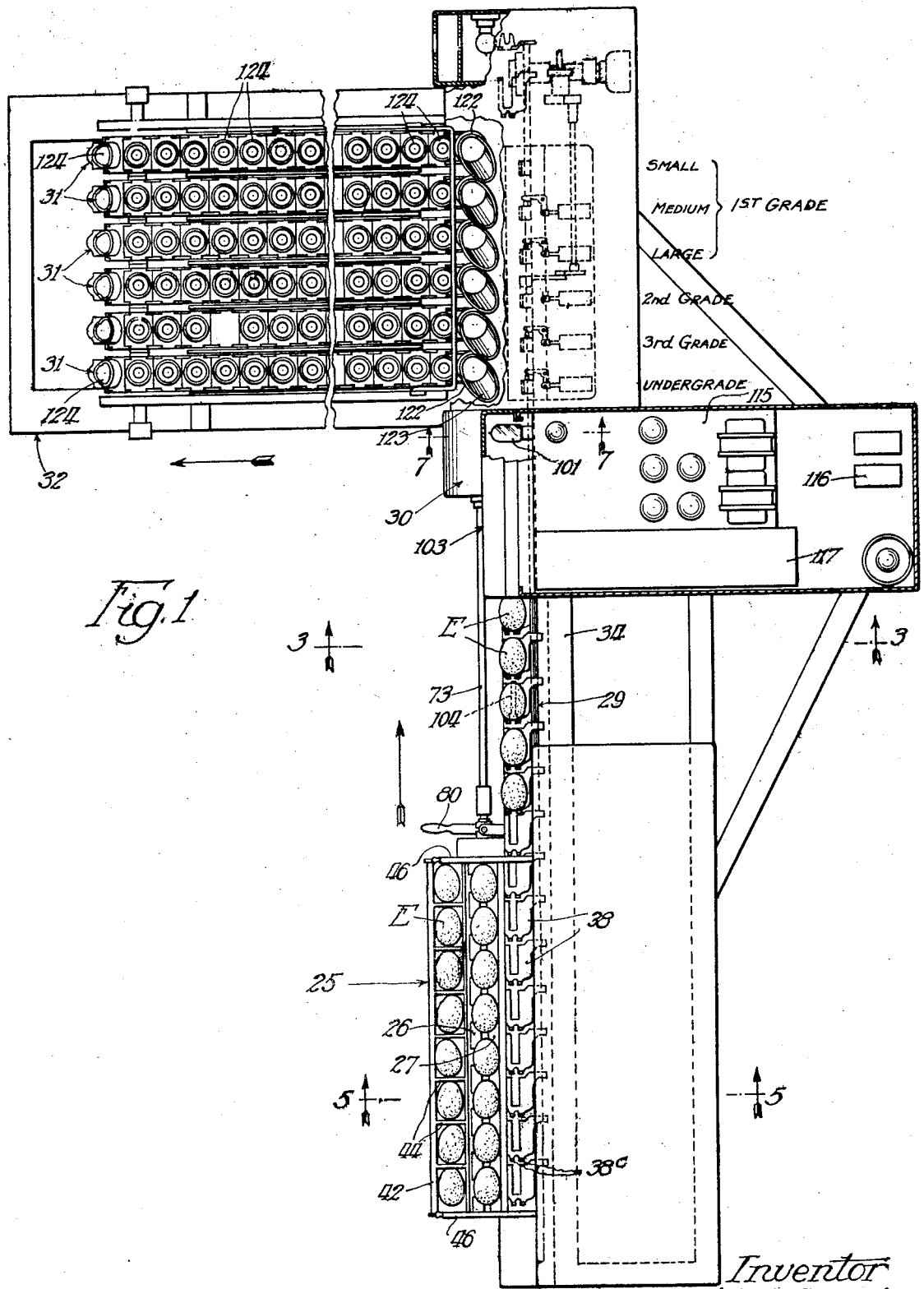
Fig. 1 is a plan.

Referring now to the drawings, and especially to Fig. 1, there is indicated at 25 a rack which is designed to be loaded with eggs by an operator of the machine. The rack 25 is reciprocated transversely of its length and serves to convey eggs placed therein to seats provided in a pair of rolls 26 and 27. The rolls 26 and 27 are suitably rotated in the same direction and serve to cause the eggs to rotate. Lights are arranged beneath the rolls 26 and 27 and in such a manner as to project a beam of light through the rotating egg. Eggs under rotation on the rolls 26 and 27 and in the path of the said beam of light, are subjected to a preliminary visual inspection at this stage. The visual inspection here possible is designed to enable the machine operator to pick out eggs which are ordinarily classified as dirties, checks, blood spots, and such other defects as are made readily noticeable by the light beam. At this stage, eggs having extremely thin whites may also be easily detected and removed, by reason of a very noticeable change in the position of the yolk and the extreme transparency of the white, but this element of inspection is not important and the possibility of making it at this stage is not relied upon for the grading of such eggs. The size of air pockets in eggs may also easily be determined in this visual inspection and eggs which have air pockets of too large size may be manually removed.

The rack 25 is also operative to feed the row of eggs from the rollers 26 and 27 to a conveyor which consists mainly of egg holders 38 mounted on and carried by a chain 29.

The eggs upon delivery to the conveyor 29 are carried forward in the direction of the rows of eggs by continuous movement. The transverse reciprocating movement of the rack 25 is synchronized with the travel of the conveyor 29 and egg holders 38 so that when the rack is moved transversely, it is operative to feed eggs from the rolls 26 and 27 to the egg holders 38. It is thus unnecessary to interrupt the travel of the conveyor 29 so that the speed of operation of the machine may be maintained at a maximum, depending largely upon the ability of an operator to supply eggs to the rack 25.

The conveyor 29 carries the eggs through inspecting mechanism indicated in its entirety by the reference numeral 30, such inspecting mechanism being, in this instance, a photo-electric cell type of mechanism similar to that disclosed in my United States Letters Patents Nos. 2,007,195 and 2,007,196 both issued July 9, 1935.

The conveyor next carries the eggs into the discharging mechanism which is controlled in part by the photo-electric inspecting mechanism and serves to separate the eggs according to classification. In the present instance, there are illustrated six receiving conveyors each designated 31. These conveyors are independently actuated and each moves forward one step for each egg delivered thereto. The conveyors 31 are in this instance designed to receive eggs classified or graded as "under grade", "third grade", "second grade", and large, medium and small "first grade" eggs, as labeled in Figs. 1 and 2.

The frame work of the mechanism may be extended as indicated at 32 at the delivery end of the conveyors 31, to provide a support for egg boxes or for crates for receiving the most prevalent grade of eggs. Other crates for the grades not expected to be found in large numbers in the particular egg lot under inspection may be located at other convenient points. An operator is of course stationed at the machine to load eggs into the rack 25, and another operator is stationed at the delivery end of the machine for removing the eggs from the conveyors 31 and depositing them in boxes or crates, as may be required. Of course, other suitable stands or racks may be provided, either as a part of or independent of the apparatus for holding crates or boxes from which and into which the eggs may be taken or packed.

*Receiving mechanism and preliminary inspection*

The egg conveying chain 29 extends around sprockets designated 33 which are suitably rotatably mounted on frame work which is indicated by the reference numeral 34. The frame work may of course be of any suitable construction and may consist of various supporting legs or brackets such as are required for the purposes of the mechanism. The chain 29 is driven in this instance by means of an electric motor 35 having a suitable driving connection with one of the sprockets 33 which carry the chain 29. In this instance, the driving connection includes a worm and worm wheel speed-reducing unit indicated at 36 and a chain drive connection 37 between the drive end of the speed-reducing unit and the shaft of the sprocket 33.

The chain 29 carries a series of regularly spaced egg holders 38, the detail construction of which is clearly shown in Figs. 4 and 5. As shown in said figures, the egg holders each comprise longitudinally extending but transversely spaced leg portions 38$^a$ and 38$^b$. The portion 38$^b$ is somewhat wider than the other leg and includes an upwardly offset portion which is provided at its forward end with a lip or extension 38$^d$ which is connected to the chain 29. The connection to the chain 29 may be through the agency of ears such as indicated at 29$^a$ formed integrally with certain links of the chain. The egg holders 38 ride on supporting elements indicated at 40 (Fig. 5) between which elements there is provided a slot designated 41.

The rack 25 consists of longitudinally extending front and back bars 42 and 43 respectively, these bars being connected by longitudinally spaced separating bars 44. At their ends, the bars 42 and 43 are also connected by means of bracket plates designated 45. The rack 25 is rigidly connected through the agency of said end brackets 45, 45 to transversely extending rods 46, 46 which are guided intermediate their lengths between pairs of rollers 47 carried by vertically movably mounted posts 48. The rear ends of the rods 46 are pivotally connected by means of adjustable connecting devices 49 to the upper ends of arms 50 which are rigidly mounted on and extend upwardly from a rock shaft 51. The rock shaft 51 is journaled in suitable bearings carried by conveniently located frame parts 34. Intermediate its ends, the rock shaft 51 is provided with a depending arm 52 rigidly connected to the rock shaft and the free end of said arm is connected by means of a link 53 to the free end of the depending arm 54 of a bell crank lever which is rockably mounted on another rock shaft 55. The said bell crank also includes an upwardly extending arm 56 which is equipped with an anti-friction roller 57 at its free end for engagement with the periphery of a rotary cam 58. The cam 58 is carried by a cam shaft 59 which is driven in predetermined synchronized relation to the feed movement of the conveyor chain 29 through the agency of a bevel gear connection indicated at 60, with one of the sprockets 33 of the conveyor chain 29. The rock shaft 55 is journaled in suitable bearings carried by conveniently located frame parts 34 and it is also provided with a bell crank comprising an upstanding arm 61 and a laterally extending arm 62. The upstanding arm 61 is provided with an anti-friction roller 63 which engages the periphery of a rotary cam 64 which is carried by said cam shaft 59. The laterally extending bell crank arm 62 has pivotally connected to it a rod 65 which depends through an aperture in a guide plate 66 which is fixedly mounted on the frame part 34. Adjacent its lower end, the rod 65 is equipped with a collar 67 and a coil spring 68 is interposed between the guide member 66 and the collar 67 to cushion the operation of certain of the parts, as will hereinafter be explained.

The vertically adjustably mounted posts 48 are slidable in supporting brackets 69, 69 and they are provided with cross pins 70 which engage the upper edges of lifting arms 71 which are mounted on the rock shaft 55.

It will be seen that as an incident to the rotation of the cam 58, the arms 50 and hence the rods 46 and the rack 25 will be reciprocated transversely. Inward movement of the rack is against the tension of springs 72 which are stretched between the arms 50 adjacent their upper ends and anchoring pins carried by the frame work of the machine. The springs 72 of course serve to return the egg rack 25 to its outermost position, as shown in full lines in Fig. 5, when permitted to do so by the cam 58. Also, rotation of the cam 64 acting through the bell crank arm 61 imparts rocking movement to the rock shaft 55, which in turn causes a rocking of the lifting arms 71 to effect vertical movement of the supporting posts 48. It will be apparent that the egg rack 25 will thus be caused to swing upwardly. The relationship of the cams 58 and 64 is such that the rack 25 is first moved inwardly in an approximately horizontal plane to substantially the position indicated in broken lines in Fig. 5. Thereupon, the cam 64 causes upward swinging movement of the rack 25 so that the bar 43 will be elevated above the tops of a row of eggs indicated at E, which were fed to the rollers 26 and 27 by the rack 25 as an incident to its inward movement. The cam 58 then permits the springs 72 to return the rack 25 to its outermost position, the cam 64 also permitting lowering of the rack to its initial position in such a manner that the rack will not on its outward movement engage the eggs deposited on the rollers 26 and 27.

The rolls 26 and 27 are intermittently rotated in the same direction and are driven by means of a connection to a shaft 73 which is continuously driven by means of chain connections 74 and 75 with the power shaft 76 of a speed reducing unit 77 which is suitably connected to an electric motor 78. The motor 78, as shown in Fig. 3, is mounted on a frame portion 34 and it will of course be understood that suitable sprockets, as indicated in the drawing, are provided for receiving the chains 74 and 75 and for transmitting rotation to the respective shafts on which the sprockets are mounted, at predetermined speeds of rotation. The shaft 73 is connected to the rollers 26 and 27 through the agency of a clutch device 79 which is adapted to be adjusted from engaged to disengaged relation through the agency of an operating lever 80. The driven end of the clutch 79 is provided with a gear 81 which meshes with similar pinion gears 82 and 83 which are respectively secured to the shafts or rollers 26 and 27.

The clutch 79 may be manually controlled through the agency of the lever 80 which is pivoted, as indicated at 84, on a suitable bracket carried by a frame part, but it is preferred that the said clutch be automatically engaged and disengaged in synchronized relation with the transverse movement of the egg rack 25. To automatically control the clutch 79, the clutch operating lever 80 is extended rearwardly beyond its pivot 84 and is connected by means of a link 85 to the free end of an arm 86 which has its other end pivoted, as indicated at 87, to a suitable bracket carried by a frame part. Intermediate its length, the arm 86 is provided with a roller 88 which is operative to engage the cam face 89 of a cam disk 90 which is secured to the cam shaft 59 (see Figs. 4 and 6). A spring 91 extending between a portion of the clutch operating lever 80 and a portion of the frame 34 normally tends to disengage the clutch 79, and the cam 89 is operative to effect and maintain engagement of the clutch for the desired length of time and in properly synchronized relation with the movements of the egg rack 25.

Underlying the egg rack 25 when in its outermost position, there is provided a support 92 provided on its upper surface with a cushion strip 93 preferably in the form of a strip of rubber. The said cushion strip is designed to support eggs placed within the pockets formed in the rack 25.

By reference to Fig. 4, it will be seen that the pockets formed between the cross bars 44 of the rack 25 are transversely aligned with recessed or grooved portions designated 26ª and 27ª respectively of the rollers 26 and 27. In the enlarged spaces 94 thus formed between the rollers 26 and 27 are located devices 95 for projecting beams of light into the eggs which are fed to the rollers 26 and 27 by the rack 25. By reference to Figs. 1 and 4, it will be understood that eggs when supported on the rollers 26 and 27 are substantially centrally located with respect to the spaces 94, so that beams of light issuing from the devices 95 will illuminate the eggs and thereby permit visual inspection thereof while the eggs are disposed on the rollers. The light devices 95 are shown in detail in Fig. 5 and consist of electric lamps 96 of suitable strength supported by sockets 97 suitably mounted under the support 92, which in this instance is illustrated as being formed of a length of angle iron. A housing for the lamp bulb 96 is indicated at 98 and is provided with an elongated or oval-shaped nozzle-like tube element 99 which serves to project a restricted beam of light from the lamp 96 through the overlying egg E. A baffle 100 may also be mounted across the end of the lamp housing 98 to prevent the spreading of light where it is not desired.

From the foregoing description it will be understood that the operator places eggs in the pockets of the rack 25 and on the support 93. From that position, the rack 25 is moved inwardly and rolls the eggs therein to a position on the rollers 26 and 27 overlying the lighting devices 95. Because of the inclined arrangement of the support 92, the eggs placed in the pockets of the rack 25 will automatically assume a position against the bar 42 so that there will be no material impact against the eggs by said bar when the rack is moved inwardly. The rollers 26 and 27 are then rotated sufficiently to cause the eggs thereon to revolve two or three times, during which time the operator makes a preliminary visual inspection of the eggs similar to the inspection made by egg candlers in the conventional method of candling eggs.

While the egg is being rotated for the purpose of the preliminary visual inspection, the rack 25 is being elevated and returned to its initial position. Another batch of eggs is positioned in the rack and upon the next inward movement of the rack, the bar 43 thereof engages the row of eggs on the rollers 26 and 27 (which at that time are stationary), and causes the said row of eggs to roll inwardly into egg holders 38 which are in movement with the chain 29. The transverse movement of the rack 25 is accurately timed to cause the eggs E rolling from the rollers 26 and 27 to roll into the said egg holders 38 just in front of upstanding back elements 38ᶜ. The brightness of the lamps 96 may be controlled by means of a suitable rheostat or otherwise, so as to permit the lights to be adjusted to the particular liking of the operator or to suit the particular batch of eggs under inspection. Such a rheostat may be located in any convenient position and is therefore not shown. The eggs which appear, as a result of the visual inspection made by the operator, to be below certain standards, may of course be removed from the conveyor by hand.

*Photo-electric grading means*

The eggs carried forward by the conveyor chain 29 and holders 38 are carried between a photo-electric cell 101 and an exciter lamp 102 contained in a housing 103. In some instances, the eggs may be positioned on the egg holders 38 slightly in advance of the upstanding back elements 38ᶜ thereof. For causing the eggs to rest against said upstanding back elements and thereby to assure accurate positioning of the eggs in the holders and maintaining predetermined timed relation between the operation of the photo-electric inspecting means and other elements of the mechanism, there is provided a yielding or spring element 104 which is suitably mounted and projects upwardly in the slot 41 and between the egg holder portions 38ᵃ and 38ᵇ. When an egg engages the said spring finger 104, its forward movement is arrested until such time as it engages the back element 38ᶜ of the egg holder to be thereby positively propelled. Of course the spring finger 104 is of sufficiently light tension to permit the egg and egg holder to ride thereover without any upward movement being imparted to the egg or egg holder.

As best seen in Figs. 7 and 8, there is provided between the photo-electric cell 101 and exciter lamp 102, a shutter arrangement controlled by the eggs for restricting the passage of light from the exciter lamp to the photo-electric cell except through an egg carried by one of the egg holders 38.

The shutter arrangement comprises a pair of arms 105 and 106 each pivoted at one end, as indicated at 107, on a supporting plate element 108 which is suitably secured to the wall element 109 of the housing 103. At their opposite ends, the shutter members 105 and 106 are provided with enlargements 105ᵃ and 106ᵃ respectively, which have adjacent edges designed to engage each other when the shutters are in closed position, to thereby prevent the passage of light from the exciter lamp 102 to the photo-electric cell. A spring 110 stretched between the shutter arms serves to yieldingly urge the same to closed position. Flared guide elements 105ᵇ and 106ᵇ depend from the shutter members 105 and 106 respectively and are adapted to be engaged by an egg in its passage therebetween. As clearly shown in Figs. 7 and 8, an egg passing between the guide elements 105ᵇ and 106ᵇ causes a spreading or opening of the shutter members 105ᵃ and 106ᵃ, so that light emanating from the exciter lamp 102 and passing through the egg E and through the opening designated 111 between the shutters, may act upon the photo-electric cell to cause the passage of an electric current.

As previously indicated, the detail operation of the photo-electric cell inspecting mechanism is fully disclosed in my said prior patents and hence need not be herein described in detail. However, it may be pointed out that between the exciter lamp and the egg holders 38 there is provided a shield 112 which is removably held in position by means of a suitably flanged bracket 113 secured to the bottom side of the plate part 114 which is supported by the machine frame. The shield 112 serves to prevent the accumulation of grit and other forms of dirt on the surface of the exciter lamp so that cleaning of the latter is not often required. It will be understood that in the event that grit or other dirt is deposited on the surface of the exciter lamp, the heat genereated by the lamp causes such material to be burned to the surface of the lamp and removed only with great difficulty. By the provision of the shield 112, it becomes a simple matter to remove the shield for cleaning or replacement.

For present purposes, it is sufficient to explain that currents passed by the photo-electric cell 101 are amplified by an amplifying unit designated 115 preferably located within the housing 103 and that the amplified current is distributed by means of an electrically actuated motor switch or distributor designated 116 to condensers contained in a receptacle 117. The details of construction of the amplifier, the motor switch or distributor and the condensers are not a part of the present invention, but these parts are conventional units available on the market. Hence they need not be described in detail. To facilitate the determination of the strength of current passed by the photo-electric cell, a milliamperemeter designated 118 is mounted on the front of the housing 103. For regulating the strength of such current, a knob 119 connected to a suitable instrument is located on said front panel and a counter 120 for indicating the number of eggs inspected by the photo-electric cell is also provided.

*Grade separating mechanism*

As previously indicated, the eggs are graded in accordance with their influence on the intensity of light which passes through the eggs and acts on the photo-electric cell 101. The present arrangement is such that those eggs which permit the passage of the greatest amount of light are graded as "first grade" and other eggs which pass successively diminished intensities of light are graded as "second", "third" and "under grade" eggs. Also, "first grade" eggs are further graded, according to size, into three groups, "small", "medium" and "large". The grading according to size is independent of the photo-electric cell arrangement.

From the egg holders 38 on the conveying chain 29, the eggs are discharged or kicked off by means of kicker arms such as indicated at 121 which are automatically rocked. The eggs discharged by the conveyor are guided by guides or chutes 122 which are provided at their upper ends with funnel-like enlargements 123 projecting in the direction from which the eggs approach the guides. The guides 122 serve to conduct the eggs downwardly and to deposit them in soft and resilient rubber cups 124 provided on the receiving conveyors 31. The receiving conveyors 31 are advanced step-by-step, one step for each egg deposited therein. It will be understood that the conveyors 31 are independently actuated each time an egg is deposited in one of the cups 124 thereof so that in each conveyor the cups are successively filled so as to provide full egg rows which facilitate further handling and packing, as will presently appear.

The grading and grade-separating means above referred to more or less generally are described in greater detail in my divisional, co-pending application Serial No. 75,982, filed April 29, 1936.

Inspection of eggs made possible with the above described mechanism eliminates errors of judgment and produces a very definite egg grade basis. Of course eggs which are very plainly below grade may be detected by the operator at the feeding end of the mechanism, and in such case may be manually removed and replaced with other eggs. However, even though an egg be removed and not replaced, the operation of the machine is not interfered with, since the absence of an egg from one position on the conveyor 29 will not cause stoppage of the machine or otherwise hinder its continued operation.

The inspection which is mainly relied upon in the mechanism is of course the photo-electric cell inspecting arrangement, and this means is entirely automatic and not subject to errors in judgment such as are well known to cause questionable grading at the hands of egg candlers.

The separation of the eggs into their distinct grades and their delivery to the receiving conveyors 31 is such that the pockets of the respective conveyors are successively filled. In other words, the eggs in each grade are delivered in continuous rows so that when an operator is removing and packing eggs from the respective conveyors 31, it is convenient to grasp a predetermined number, for example, three eggs in each hand, and to place such eggs in a carton, case or other container. It will also be observed that the eggs are uniformly delivered with their pointed ends down, so that in the final packing, the eggs appear with their large or blunt ends up. This arrangement produces the most attractive package which merchandisers consider desirable from a sales standpoint. The delivery of eggs in this particular manner is dependent only upon the care of the operator at the egg receiving end of the machine, it being only necessary that such operator place the eggs point foremost in the rack 25.

In the practical operation of the machine, it has been found that an average operator at the starting end of the machine is capable of placing as many as 12 eggs in the pockets of the reciprocating rack for each feed movement of the rack. However, for practical purposes, and to afford such operator a better opportunity for visual inspection of the eggs, it is contemplated that a rack having a capacity of 8 eggs (as shown) will be adequate. Of course the speed of operation of the machine may be controlled by varying the speed of travel of the egg conveyor 29, and it is apparent that the speed of operation, within practical limits, need be restricted only in accordance with the ability of the operators to feed and remove eggs to and from the machine.

Changes in the described construction may be made without departing from the spirit of the invention, the scope of which should be determined by reference to the following claims, the same being construed as broadly as possible consistent with the state of the art.

I claim:

1. In an egg candling machine, the combination of a conveyor for receiving and propelling eggs, a rack, means underlying the rack for supporting eggs positioned in the rack, means intermediate said support and said conveyor for receiving the eggs in said rack, light means for projecting beams of light into the eggs on said intermediate means for permitting visual inspection of the eggs, and means supporting said rack for movement transversely of said intermediate means and said conveyor whereby the rack is movable to feed eggs therein to said intermediate means, and means for feeding eggs from said intermediate means to said conveyor.

2. In an egg candling machine, the combination of a pair of rolls cooperating to rotatably support an egg, means for projecting light through an egg positioned on said supporting rolls, a platform adjacent said rolls, a rack initially overlying said platform for initially positioning an egg thereon, means for reciprocating said rack so as to feed an egg from said platform to said cooperating rolls and to return the rack to said initial position, and means carried by said rack for discharging an egg from said cooperating rolls as an incident to the feed movement of the rack.

3. In an egg candling machine, the combination of a pair of cooperating rolls having longitudinally spaced seats formed thereon for rotatably supporting a row of eggs, means for projecting light through eggs positioned on said supporting rolls, a platform adjacent said cooperating rolls, a rack for positioning eggs in a row on said platform, means for effecting reciprocation of said rack so as to feed the row of eggs from said platform to the seats on said cooperating rolls and to return the rack to its initial position relative to said platform, a conveyor provided with egg holders for receiving and carrying away eggs, and means constituting a part of said rack for feeding a row of eggs from said cooperating rolls to said conveyor as an incident to the feed movement of the rack.

4. In an egg candling machine, the combination of a pair of cooperating rolls for rotatably supporting a row of eggs, means for projecting light through eggs positioned on said supporting rolls, a platform adjacent said rolls for initially receiving such a row of eggs, a rack for positioning the eggs in a row on said platform and for feeding such row to said rolls, a conveyor for receiving a row of eggs from said cooperating rolls, means constituting a part of said rack for feeding the row of eggs from said rolls to said conveyor, and means for effecting horizontal feed movement of the rack and upward movement thereof to clear the row of eggs on said rolls and rearward return movement to initial position adjacent said platform.

5. In an egg candling machine, the combination of a pair of cooperating rolls for rotatably supporting a row of eggs, means for projecting light through eggs positioned on said supporting rolls, a platform adjacent said rolls for initially receiving such a row of eggs, a rack for positioning the eggs in a row on said platform and for feeding such row to said rolls, a conveyor for receiving a row of eggs from said cooperating rolls, means constituting a part of said rack for feeding the row of eggs from said rolls to said conveyor, means for effecting horizontal feed movement of the rack and upward movement thereof to clear the row of eggs on said rolls and rearward return movement to initial position adjacent said platform, and means for effecting synchronized travel of said conveyor and reciprocating feed movement of said rack.

6. In an egg candling machine, the combination of a pair of cooperating rolls for rotatably supporting a row of eggs, means associated with said rolls for projecting beams of light into eggs of such row of eggs to facilitate inspection thereof, a platform adjacent said rolls for initially receiving such a row of eggs, a rack for positioning the eggs in a row on said platform and for feeding such row to said rolls, a conveyor for receiving a row of eggs from said cooperating rolls, means constituting a part of said rack for feeding the row of eggs from said rolls to said conveyor, and means for effecting horizontal feed movement of the rack, upward movement thereof to clear the row of eggs on said rolls and rearward return movement to initial position adjacent said platform.

7. In an egg candling machine, the combination of a pair of rolls for rotatably supporting a row of eggs, means for automatically feeding a row of eggs to said rolls, and means for automatically effecting intermittent rotation of said rolls, said means being synchronized with the egg feeding means so as to maintain the rolls stationary when the eggs are fed to the rolls.

8. In an egg candling machine, the combination of elongated means for supporting a row of eggs, means for projecting light through eggs disposed on said supporting means for visual inspection purposes, a platform adjacent said supporting means for preliminarily receiving and positioning eggs in a row, and a rack positioned adjacent said supporting means and movable transversely of the length of said platform and supporting means for feeding a row of eggs transversely of its length from said platform to said supporting means, said platform being inclined so as to cause the eggs placed thereon to assume a position in contact with said rack, thereby to prevent impact between said rack and eggs upon operation of the former.

9. In an egg candling machine, the combination of means for receiving a row of eggs, a platform adjacent said receiving means for preliminarily receiving and positioning eggs in a row, and a rack positioned adjacent said platform and movable transversely of said platform and receiving means for feeding a row of eggs transversely from said platform to said receiving means, said platform being inclined so as to cause the eggs placed thereon to assume a position in contact with the said rack, thereby to prevent impact between said rack and eggs upon operation of the former.

10. In an egg candling machine, the combination of a pair of axially parallel rolls for rotatably supporting a row of eggs, said rolls having longitudinally spaced portions of reduced diameter forming seats for positioning the eggs on the rolls and openings between the rolls for facilitating the projection of light through eggs positioned on the rolls, a source of light disposed beneath said rolls, and light emitting nozzles communicating with said source of light and with said openings, said nozzles being of approximately oval cross-sectional shape so as to permit the passage therethrough of a beam of light which more or less corresponds in cross-section to the overlying egg area, said nozzles serving to substantially restrict the light beam emanating from said source of light to the areas of the eggs positioned on the rolls.

11. In an egg candling machine, the combination of a pair of axially parallel rolls for rotatably supporting a row of eggs, said rolls having longitudinally spaced portions of reduced diameter forming seats for positioning the eggs on the rolls and openings between the rolls for facilitating the projection of light through eggs positioned on the rolls, a source of light disposed beneath said rolls, and light emitting nozzles communicating with said source of light and with said openings, said nozzles extending upwardly in said openings between the rolls and terminating intermediate the diameter of the rolls in their reduced diameter portions, and said nozzles being such as to permit the passage of light beams of cross-sectional area sufficient to effectively illuminate the eggs for visual inspection purposes and to prevent the passage of inspection-hampering light rays from said source past the sides of the eggs.

RAYMOND R. HAUGH.